United States Patent [19]

Kwak et al.

[11] Patent Number: 5,202,004
[45] Date of Patent: Apr. 13, 1993

[54] SCANNING ELECTROCHEMICAL MICROSCOPY

[75] Inventors: Juhyoun Kwak, Pasadena, Calif.; Allen J. Bard; Fu-Ren F. Fan, both of Austin, Tex.

[73] Assignee: Digital Instruments, Inc., Santa Barbara, Calif.

[21] Appl. No.: 452,841

[22] Filed: Dec. 20, 1989

[51] Int. Cl.$^5$ .............................................. G01N 27/00
[52] U.S. Cl. ................................. 204/153.1; 204/400; 204/412; 250/306; 250/307
[58] Field of Search ............... 204/153.1, 153.11, 404, 204/400, 406, 407, 412; 250/306, 307

[56] References Cited

U.S. PATENT DOCUMENTS

| | | | |
|---|---|---|---|
| 4,306,951 | 12/1981 | Depp et al. | 204/129.3 |
| 4,510,364 | 4/1985 | Ito | 219/69 G |
| 4,510,365 | 4/1985 | MacGregor et al. | 219/69 G |
| 4,528,451 | 7/1985 | Petric et al. | 250/441.1 |
| 4,564,436 | 1/1986 | Buzzonco et al. | 204/400 |
| 4,608,138 | 8/1986 | Kobayashi | 204/129.3 |
| 4,868,396 | 9/1989 | Lindsay | 250/440.1 |
| 4,924,091 | 5/1990 | Hansma et al. | 250/306 |
| 4,968,390 | 11/1990 | Bard et al. | 204/15 |
| 4,969,978 | 11/1990 | Tomita et al. | 204/153.1 |

OTHER PUBLICATIONS

Bining and Rohrer, Helvetica Physica Acta (1982) 55:726–735.
Isaacs and Kendig, National Assoc. of Corrosion Engineers (1980) 36(6):269–274.
Rosenfeld and Danilov, Corrosion Science, (1967) 7:129–142.
Engstrom et al., Anal. Chem. (1987) 59:2005–2010.
Lin et al., J Electrochem. Soc., (1987) 134(4):1038–1039.
Craston et al., J. Electrochem. Soc., (1988) 135(3):785–786.
Bard et al., Anal. Chem., (1989), 61:132.
Kwak, Dissertation: Scanning Electrochemical Microscopy, (1989) pp. 1–15, 51–55 and 90–91.
Kwak and Bard, Anal. Chem. (1989), 61:1794–1799.

Primary Examiner—John Niebling
Assistant Examiner—William T. Leader
Attorney, Agent, or Firm—Arnold, White & Durkee

[57] ABSTRACT

A method for locating a chemical substance on the surface of a material and for determining the contour of a surface of a material using a scanning electrochemical microscope is provided in the present invention. The substance to be examined is immersed in a solution, the tip of a working electrode is positioned in the solution proximate the surface and an electric potential is connected directly or indirectly between the tip and the material generating a current through the tip and producing an electrochemical reaction. The current through the tip is measured at a plurality of points while the tip is scanned across the surface. The current at each point in the scan is preferably plotted to produce an image of the contour or of the differing chemical compositions on the surface of the substance being examined. The solution in which the substance and working electrode tip are immersed is chosen to enable electrochemically generated reduction and oxidation processes to occur between the surface and the tip. The changing contour or change of chemical substances over which the working electrode is scanned produces related differences in current through the tip. Light emission by electrogenerated chemiluminescence or inverse photoemission spectroscopy may also be produced and measured in the method of the present invention.

45 Claims, 8 Drawing Sheets

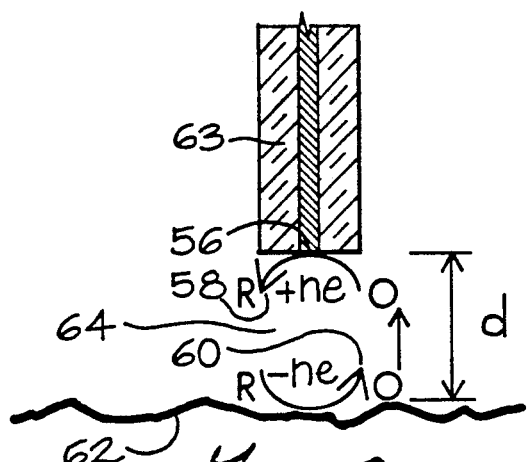
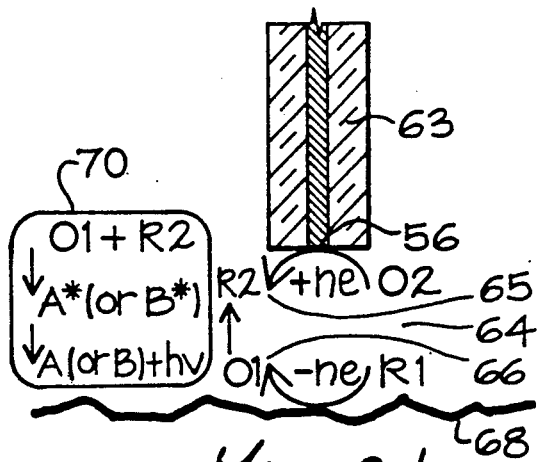
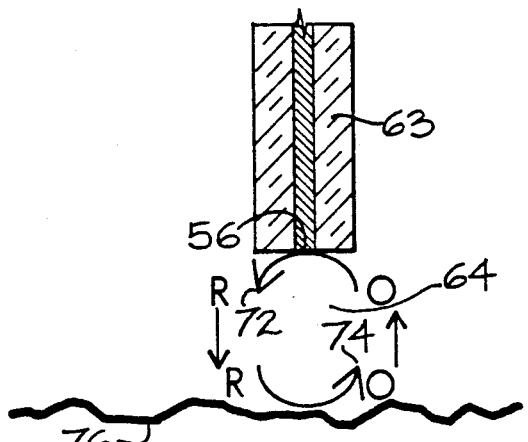
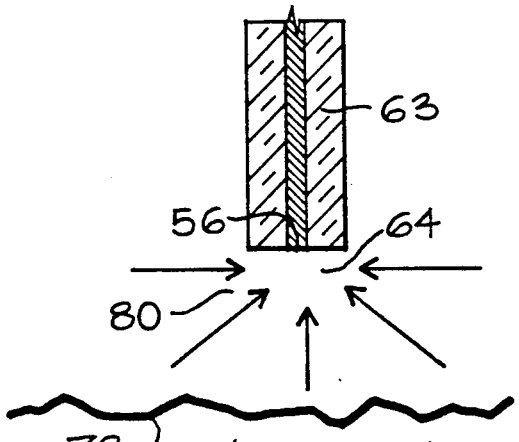
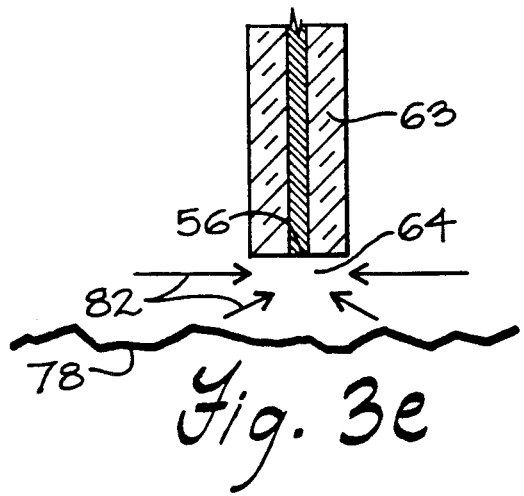

SCANNING ELECTROCHEMICAL MICROSCOPY

BACKGROUND OF THE INVENTION

1. Field of the Invention

This invention relates to a method for characterizing a surface utilizing electrochemically generated current flows through an ultra microelectrode type tip near a surface of a substrate immersed in a solution. In particular, the invention relates to scanning the tip relative to the surface to characterize contour and composition features of the surface.

2. Description of Related Art

The scanning electrochemical microscope marginally resembles the scanning tunneling microscope in its use of a tip to scan a surface of a substrate material. A scanning tunneling microscope depends upon the flow of a tunneling current between the tip and the substrate. The distance between the tip and substrate is typically of the order of one nanometer (nm) or less. Topographic resolution is typically of this size scale, i.e. of the order of nanometers. In scanning tunneling microscope applications where the substrate is in solution, the tunneling current is a nonfaradaic one; that is, no chemical changes in solution components or substrate surface species occur due to the current flow. Because the current is nonfaradaic, the current through the tip cannot be related directly to the substrate potential by consideration of the redox potentials of appropriate half reactions.

As used throughout this document, the term substrate refers to a material, and particularly a surface of a material, preferably being scanned utilizing the present invention. Further, as used throughout this document, the positioning of a tip substantially perpendicular to a surface refers to positioning the tip in a manner that a line may be drawn substantially perpendicular to the surface that will substantially perpendicularly intersect a small cross-sectional area of the tip at which electrochemical reactions preferably occur. Also as used throughout this document, connecting an electric potential between a tip and a substrate may include connecting an electric potential between a tip and an auxiliary electrode and connecting an additional potential between the auxiliary electrode and the substrate producing a potential between the tip and the substrate. A reference electrode is preferably used to measure the potential of the tip and the substrate. As used throughout this document, the positioning of a tip proximate to a surface refers to positioning the tip in the range of approximately less than one tip diameter from the surface to approximately eight tip diameters from the surface.

SUMMARY OF THE INVENTION

1. Generation/Collection Mode—Chemical Substance Location

The method of the present invention of locating a chemical substance on a surface of a substrate material or determining the contour of a surface largely solves the problems associated with the surface topographic resolution available under scanning tunneling microscopy.

In a first preferred embodiment of the present invention, referred to as the generation/collection mode, a substrate and a working electrode tip are immersed in a solution. A controllable electric potential is preferably placed between the substrate and the working electrode tip. Electric potentials are preferably measured with respect to a reference electrode also immersed in the solution. Therefore, the substrate potential and the working electrode tip potential are each measured with respect to the reference electrode. Then electric potentials are controllable to enable desired electrochemical reactions to occur at the tip and substrate.

The method of the present invention of locating a chemical substance on a surface of a material comprises, in this embodiment, the steps of immersing the surface in a solution, positioning a tip of a working electrode in the solution proximate and, preferably substantially perpendicular to the surface, connecting an electric potential between the tip and the material and generating a current through the tip producing an electrochemical reaction in the immediate vicinity of the tip and measuring the current through the tip. To locate a chemical substance on the surface of the material, the tip is scanned relative to the surface. Because the surface need not be of a uniform contour, the distance between the surface and the tip is preferably held fixed relative to a reference plane where the reference plane is substantially parallel to the surface being scanned. Therefore, the step of measuring the working tip current further comprises the step of moving the tip relative to the surface and proximal to a plurality of points forming the reference plane where the plurality of points comprise at least one point proximal the chemical substance, maintaining a substantially constant distance of the working tip from the reference plane and measuring the working tip current at each point of the plurality of points forming the reference plane. Where at least one point of the plurality of points forming the reference plane is proximal the chemical substance, the tip is assured of being positioned to be enabled to detect the chemical substance.

The electrochemical reaction preferably comprises producing oxidation or reduction processes immediate the working tip and surface of the material. The solution in which the material and working tip are immersed is selected based on the material and the chemical substance sought to be detected wherein the solution is capable of supporting electrochemically generated oxidation or reduction processes immediate the working tip. The solution also is preferably capable of supporting electrochemically generated reduction or oxidation processes immediate either the chemical substance, the material, or both to varying degrees.

Additionally, the step of connecting an electric potential between the tip and the material further comprises connecting a direct current between the tip and the material or connecting a potential having an alternating current component between the working tip and the material. Where a potential having an alternating current component is connected, the step of measuring the working tip current further includes the step of measuring a phase angle of the alternating current component between the material and the tip. The method of the present invention may be utilized where the material comprises a conductive material, a semiconductive material or a combination thereof.

2. Generation/Collection Mode—Determining a Contour of a Surface

Under this preferred embodiment of the method of the present invention, a determination of the contour of a surface of a material comprises the steps of immersing the surface in a solution, positioning the tip of a working electrode in the solution proximate and, preferably substantially perpendicular to the surface, connecting a controllable electric potential between the tip and the material and generating a current through the working tip and producing an electrochemical reaction in the immediate vicinity of the working tip and measuring the working tip current. To determine the contour of the surface, the working tip is moved relative to the surface to scan the desired area of the surface and the tip current is measured at a plurality of tip locations during the scan. The tip is moved relative to the surface proximal to a plurality of points in a reference plane while maintaining a substantially constant distance of the working electrode tip from the reference plane. The plurality of points comprises points proximal the surface. The working current at each point of the plurality of points is measured.

The electrochemical reaction preferably comprises producing oxidation or reduction processes immediate the working tip. The solution in which the surface is immersed is preferably capable of supporting electrochemically generated oxidation and reduction processes. The material of the surface is preferably a conductive material, a semiconductive material or a combination thereof.

The electric potential connected between the tip and the material is preferably either a direct current or an electric current having an alternating current component. Where the electric potential has an alternating current component, the step of measuring the current further comprises measuring a phase angle of the alternating current component between the material and the working tip.

3. Generation/Collection Mode—Optical Coupling

In still another preferred embodiment of the present invention, a method of locating a chemical substance on a surface of a material comprises the steps of immersing the surface in a solution, positioning the tip of a working electrode in the solution proximate and, preferably substantially perpendicular to the surface, connecting a controllable electric potential between the tip and the material and generating a current through the tip producing a light emission and detecting the light emission. The light emission is preferably produced by electrogenerated chemiluminescence or by inverse photoemission spectroscopy at the points on the substrate distinguished by the presence or absence of the substance being located.

The step of detecting the light emission preferably comprises positioning a light emission sensitive detector adjacent the surface and placing the material, the working electrode tip and the light detector in an environment restricted from interfering light. Interfering light includes light that may cause the light emission detector to falsely indicate a light emission or fail to detect a light emission.

The method of this preferred embodiment of the present invention preferably further comprises the steps of moving the working electrode tip relative to the surface and proximal to a plurality of points in a reference plane wherein the plurality of points comprise at least one point proximal the chemical substance, maintaining a substantially constant distance of the working electrode tip from the reference plane and detecting light emission at each point of the plurality of points.

Further, the step of connecting an electric potential between the tip and the material preferably further comprises connecting a direct current electric potential.

The solution utilized is preferably capable of supporting electrogenerated chemiluminescence or inverse photoemission spectroscopy. The surface preferably comprises a conductive material, a semiconductive material, or a combination thereof.

4. Generation/Feedback Mode—Determining a Contour of a Surface

In a generation/feedback mode method of the present invention, a potential is preferably applied to a working electrode tip. The tip current is, in part, a function of the nature of the substrate, the solution and the distance between the substrate and the tip. This mode differs from the generation/collection mode in that the substrate itself need not be connected to an external potential source. Therefore, the feedback mode can be used with nonconductive as well as conductive and semiconductive substrates.

A preferred method of determining the contour of a surface in the generation/feedback mode comprises the steps of immersing the surface in a solution, positioning the tip of a working electrode in the solution proximate and, preferably substantially perpendicular to the surface, positioning a tip of an auxiliary electrode in the solution in a distal relation to the working electrode, connecting a controllable electric potential between the working electrode and the auxiliary electrode, and measuring an electric current flowing through the working electrode tip. This method preferably further comprises the step of producing an electrochemical reaction immediate the working tip. The auxiliary electrode is positioned at a sufficient distance from the working electrode to avoid interfering with the electrochemical reaction in the vicinity of the working tip.

The method of the present invention preferably further comprises the step of positioning the tip of a reference electrode, including but not limited to a saturated calomel electrode or a silver quasireference electrode, in the solution near the working tip and measuring the electric potential of the working electrode with respect to the reference electrode. Preferably, the reference electrode is positioned near the working electrode tip but not so near as to interfere with the electrochemical reaction immediate the working tip. The auxiliary electrode need merely be in the solution in the general area of the surface.

The electrochemical reaction immediate the working tip preferably comprises either oxidation or reduction processes.

The step of measuring the electric current flowing through the working tip of this preferred embodiment preferably also comprises the step of measuring an electric potential by connecting a high impedance voltage measuring system between the reference electrode and the working electrode. Preferably, this electric potential is maintained at a substantially constant level.

Additionally, the step of measuring the electric current flowing through the working electrode tip preferably further comprises the steps of moving the working electrode tip relative to the surface and proximal to a plurality of points in a reference plane wherein the plurality of points comprise points proximal the surface, maintaining a substantially constant distance of the working electrode tip from the reference plane, and measuring the working tip current at each point of the plurality of points. The working electrode tip is preferably moved at a speed sufficient to establish the electric current at at least a quasi-steady-state level. That is, the electrode tip is not moved so quickly through the plurality of points that the electric current measured is not at a quasi-steady-state level. The change in tip current is indicative of the contour of the surface. Preferably, the reference electrode is in a substantially fixed relationship to the working electrode.

In the method of this preferred embodiment of the present invention, the solution is preferably capable of supporting electrochemically generated oxidation and reduction processes. Additionally, the material of the surface preferably comprises electrically insulative, electrically semiconductive, electrically conductive material or a combination thereof. These categories of materials include biological materials.

5. Generation/Feedback Mode—Locating a Chemical Substance

In another preferred embodiment of the present invention, a method of locating a chemical substance on a surface of a material comprises the steps of immersing the surface in a solution, positioning the tip of a working electrode in the solution proximate and, preferably substantially perpendicular to the surface, positioning the tip of an auxiliary electrode in the solution in distal relation to the working electrode, connecting a controllable electric potential between the working electrode and the auxiliary electrode, and measuring an electric current flowing through the working electrode tip. The method of this preferred embodiment preferably further comprises the steps of producing an electrochemical reaction in the immediate vicinity of the working tip and positioning the tip of a reference electrode in the solution near the working electrode tip and measuring an electric potential of the working electrode with respect to this reference electrode. The electric potential between the working electrode and the auxiliary electrode is preferably maintained at a substantially constant level.

Preferably, a high impedance voltage measuring system measures the voltage between the reference electrode and the working electrode. Additionally, the step of measuring the electric current flowing through the working electrode tip preferably comprises the steps of moving the working electrode tip relative to the surface and proximal to a plurality of points in a reference plane wherein the plurality of points comprises at least one point proximal the chemical substance, maintaining a substantially constant distance of the working electrode tip from the reference plane and measuring the working tip current at each point of the plurality of points. Additionally, the working electrode is preferably moved at a speed sufficient to establish the electric current flowing through the electrode tip at at least a quasi-steady-state level. The change in tip current is indicative of the substance on the surface proximate the tip. Preferably, the reference electrode is in a substantially fixed relationship to the working electrode.

The electrochemical reaction produced at the working tip preferably comprises either an oxidation or a reduction process immediate the working tip.

The solution in which the surface is immersed is preferably capable of supporting electrochemically generated oxidation and reduction processes. The chemical substance preferably comprises electrically insulative, electrically semiconductive, electrically conductive material or a combination thereof. These categories of materials include biological material.

In still another preferred embodiment of the present invention, the electric potential of the working tip or of the substrate is scanned across a range of potentials, as measured with respect to the reference electrode, for each location of the tip relative to the substrate. The tip currents measured relative to the range of potentials at each location of the tip are indicative of the substances on the surface proximate the tip at each location.

6. Generation/Feedback Mode—Determining a Contour of a Surface Utilizing a Substantially Constant Current In yet another preferred embodiment of the present invention, a method of determining a contour of a surface comprises the steps of immersing the surface in a solution, positioning a tip of a working electrode in the solution, preferably positioning the working electrode substantially perpendicular to the surface, positioning a tip of an auxiliary electrode in the solution in distal relation to the working electrode, connecting a controllable electric potential between the working electrode and the auxiliary electrode, producing an electric current in the working tip, maintaining a substantially constant current level in the working tip, and measuring a voltage at the working tip. Preferably the step of measuring a voltage at the working tip further comprises positioning a tip of a reference electrode in the solution near the working tip and measuring the potential of the working electrode with respect to the reference electrode.

The step of measuring a voltage at the working tip comprises the steps of moving the working electrode tip relative to the surface and proximal to a plurality of points in a reference plane wherein the plurality of points comprises points proximal the surface, maintaining a substantially constant distance of the working electrode tip from the reference plane, and measuring the voltage at the working tip at each point of the plurality of points. Preferably, the working electrode moves at a speed relative to the surface sufficient to establish this voltage at a quasi-steady-state level. The change in tip voltage is indicative of the substance on the surface proximate the tip. Preferably, the reference electrode is in a substantially fixed relationship to the working electrode.

The method of this preferred embodiment of the present invention further comprises the step of producing an electrochemical reaction in the immediate vicinity of the working tip and the electrochemical reaction preferably comprises oxidation or reduction processes at the working tip. The solution in which the surface is immersed is preferably capable of supporting electrochemically generated oxidation or reduction processes. The surface immersed in the solution preferably comprises either electrically insulative, electrically semiconductive, or electrically conductive material, or a combination thereof. These categories of materials include biological material.

BRIEF DESCRIPTION OF THE DRAWINGS

FIGS. 3a and 3b are cross-sections of a working electrode tip and substrate in the generation/collection mode in accordance with the present invention;

FIG. 3c is a cross-section of a working electrode tip and a conductive or semiconductive substrate in accordance with the present invention;

FIGS. 3d and 3e are a cross-section of a working electrode tip and an insulative substrate in accordance with the present invention;

DETAILED DESCRIPTION OF THE PREFERRED EMBODIMENTS

1. General Principles

Figure 1A:
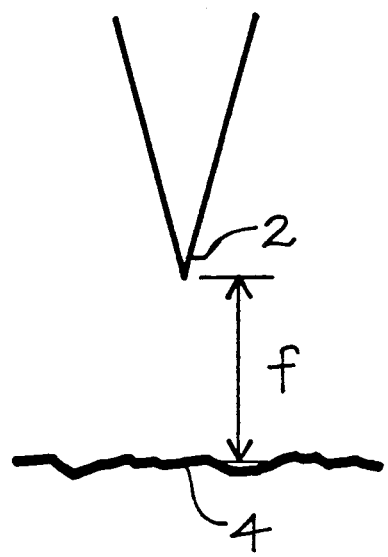
FIG. 1a is a cross-section of a tip and a substrate for a typical scanning tunnel microscope.

Referring to FIG. 1a, uninsulated tip 2 and surface 4 are shown from a typical scanning tunneling microscope (STM). Since STM depends upon the flow of a tunneling current between tip 2 and substrate 4, the distance (f) between them is of the order of 1 nanometer (nm) or less and surface topographic x-y resolution of this size scale is typical. The distance (f) between tip 2 and surface 4 is typically maintained as a substantially constant distance in STM applications.

Figure 1B:
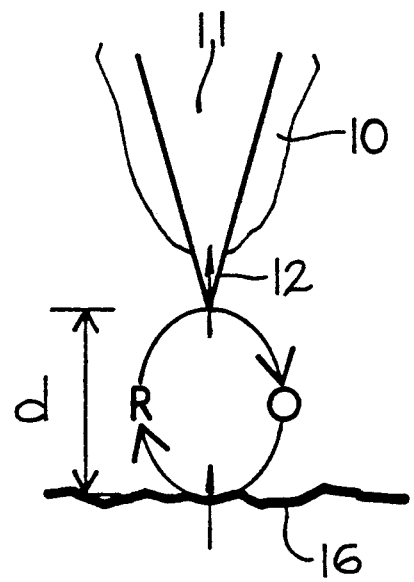
FIG. 1b is a cross-section of a tip and a substrate for a typical scanning electrochemical microscope.

Referring now to FIG. 1b, the tip to surface relationship from a typical scanning electrochemical microscope (SECM) is shown. Insulation 10 surrounds working electrode 11. Working electrode tip 12 may project outward from insulation 10. Tip 12 is positioned proximate and substantially perpendicular to surface of substrate material 16. The distance (d) between tip 12 and surface 16 is variable in the preferred embodiments of the present invention. An electric potential connected between tip 12 and surface 16 produces an electrochemical reaction in the immediate vicinity of tip 12 and surface 16.

The electric potential connected to tip 12 creates a current which is carried by redox processes (reduction and oxidation processes) at tip 12 and surface 16. The current is controlled by electron transfer kinetics at the interfaces and mass transfer processes in the solution so that measurements at large spacings, e.g., in approximately the range of 1 nm to 10 microns (um), can be made.

Figure 2:
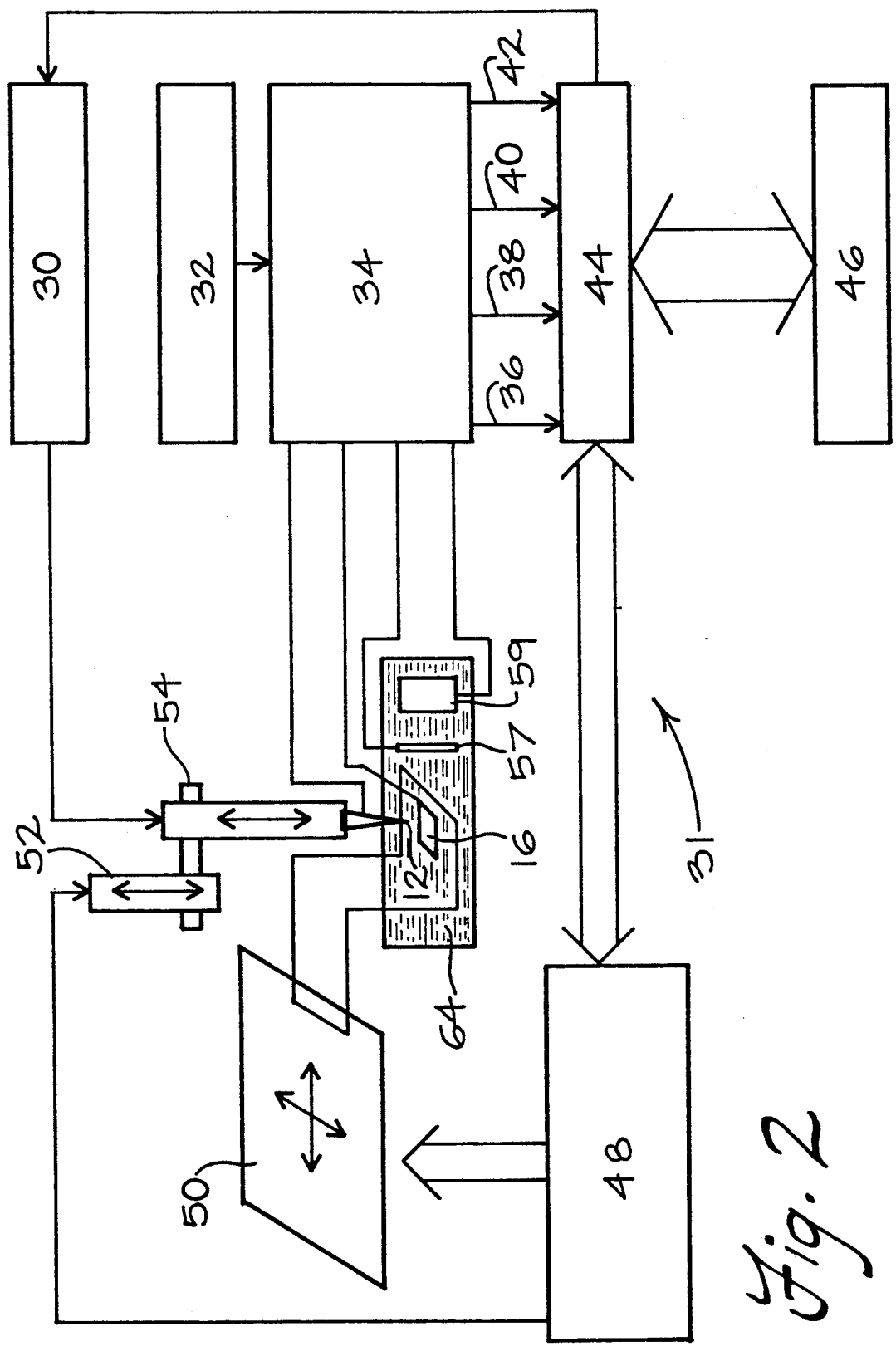
FIG. 2 is a schematic diagram of a typical scanning electrochemical microscope.

Referring now to FIG. 2, typical scanning electrochemical microscope 31 on which the method of the present invention may be performed is illustrated. Substrate material 16, also referred to as the surface of the material being scanned, is immersed in solution 64. Solution 64 may be aqueous or nonaqueous. Working electrode tip 12 is positioned proximate and substantially perpendicular to substrate 16. Working tip 12 is scannable over substrate 16 through x-y-z stage controller 48. Stage controller 48 controls both x-y stage 50 and z stage 52. Additionally, fine piezoelectric element 54 is preferably employed to allow fine resolution in the z direction of working tip 12. The resolution of fine piezoelectric element 54 is on the order of angstroms. Interface 44 enables microcomputer 46 to communicate with x-y-z stage controller 48 and to receive data from bipotentiostat 34. Tip voltage ($E_T$) data 36, substrate voltage ($E_S$) data 38, tip current ($I_T$) data 40 and substrate current ($I_S$) data 42 connect to interface 44. Potential programmer 32 is preferably used to set the desired voltage or current outputs from bipotentiostat 34. Reference electrode 57 and auxiliary electrode 59 also connect to bipotentiostat 34 along with tip 12 and substrate 16. Interface 44 further connects with high voltage amplifier 30 to control fine piezoelectric element 54.

Scanning electrochemical microscope 31 preferably enables the user to set desired voltages or currents through tip 12 relative to either substrate 16 or reference electrode 57 and enable the user to practice the present invention on substrate material 16.

2. The Generation/Collection Mode

Referring to FIG. 3a, the operation of the generation/collection mode is illustrated. Working electrode tip 56 is preferably exposed as a substantially flat surface facing the surface to be scanned. Tip 56 is otherwise surrounded about its perimeter by electrical insulation preferably in the form of insulating sheath 63. Insulation 63 preferably reduces potential fringing fields that may reduce resolution. The resolution of a scanning electrochemical microscope practicing the present invention depends, in part, on tip size and shape. Preferably, a disk inlaid in insulation forms the working electrode tip. A hemispherical shaped tip is also useful. Conical or tapered cylindrical tips may also be used. Resolution obtained by the present invention increases as the tip diameter decreases.

Working electrode tip 56 is positioned proximate and substantially perpendicular to a surface of conductive or semiconductive substrate material 62. Working tip 56 is held at electric potential $E_T$ and substrate 62 is held at potential $E_S$. $E_T$ and $E_S$ are preferably measured relative to a reference electrode. Similarly, merely placing a potential between substrate 62 and electrode tip 56 may also be sufficient. The potential of the substrate is preferably stepped to the value $E_S$ and the potential of tip 56 is preferably stepped to a potential $E_T$ where an electrochemical reaction, for example oxidation and reduction processes, may occur. Solution 64 is selected to enable electrochemically generated oxidation and reduction processes to occur.

Oxidation may be represented as involving a loss of electrons by one molecule and reduction as involving an absorption of electrons by another molecule. Reduction process 58 illustrates an 0 species reduced to an R species and oxidation process 60 represents an R species oxidized to an 0 species in solution 64.

In the method of the present invention, current ($I_T$) flowing through tip 56 is preferably measured as a function of time at a substantially constant distance from substrate 62. In this generation/collection mode, the invention enables measurement of the distance between tip 56 and substrate 62 from the time of onset of the collection current, that is the time required for substrate generated oxidized species to transit the gap and reach tip 56. Therefore, the distance between tip 56 and substrate 62 at a given location can be measured as a function of the time from the powering of substrate 62 until the time the change in current from the substrate generated oxidized species is detected at tip 56. The tip current may initially be composed of both nonfaradaic (charging) and faradaic components. The initial tip current, therefore, may be coupled via interelectrode capacitance and resistance to the substrate producing a transient tip current that interferes, especially at small distances between the working tip and substrate and at small time intervals, with the desired measurement of the faradaic $I_T$.

Figure 4:
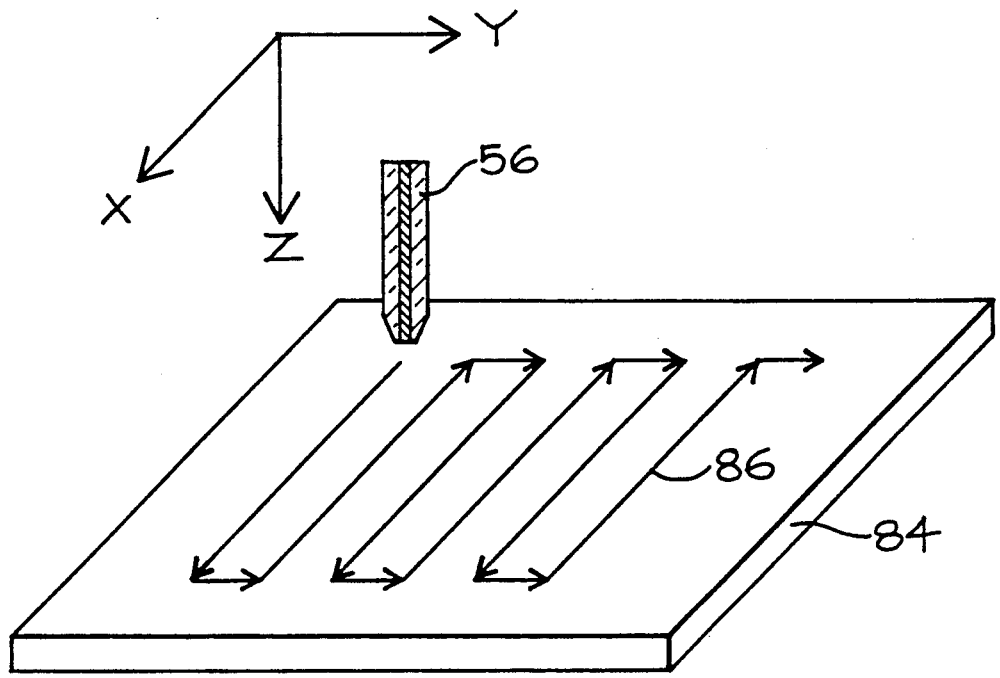
FIG. 4 is a perspective view of a typical scan of a working electrode tip across a surface of a substrate.

Referring now to FIG. 4, tip 56 is preferably scanned across substrate material 84. A typical scanning pattern 86 is illustrated.

Referring to FIG. 3a, when tip 56 is scanned across substrate 62 and the tip is held at a potential $E_T$, variations in tip current $I_T$ will result from changes in the contour of surface of substrate 62 or from changes in the chemical substance over which tip 56 is positioned. The electric current through tip 56, $I_T$, is preferably either a direct current or an electric current having an alternating current component. Where the current has an alternating component, the phase angle of the alternating current component is also measured during the measurement of $I_T$.

3. Generation/Collection Mode—Optical Coupling

Referring to FIG. 3b, working electrode tip 56 is positioned proximate and substantially perpendicular to conductive or semiconductive substrate 68. Reduction process 65 and oxidation process 66 occur in solution 64 when potentials $E_T$ and $E_S$ are applied. Chemiluminescent reaction 70 occurs when one of the reaction products is in an excited electronic state (designated by an asterisk) from which it can undergo deactivation by emission of a photon thus producing a detectable light. A light sensitive detector positioned near tip 56 detects the photon emission. The rate of photon generation is preferably counted per unit time in each position of tip 56 during a scan of substrate 68. The photon count indicates the contour or chemical composition of substrate 68. The photon count rate is measured in this preferred embodiment without the need to measure tip current $I_T$.

This preferred embodiment avoids possible difficulties associated with interelectrode capacitance and resistance that may produce a transient tip current interfering with the faradaic $I_T$. Such an interfering transient can make estimation of the time of onset of the collection current difficult.

4. Generation/Feedback Mode Using Conductive or Semiconductive Substrates

Referring to FIG. 3c, working electrode tip 56 is positioned proximate and substantially perpendicular to conductive or semiconductive substrate 76 in solution 64. Reduction process 72 and oxidation process 74 preferably occur immediate tip 56 and substrate 76 when electric potentials $E_T$ and $E_S$ are applied to the tip and substrate respectively.

The tip is preferably scanned across substrate 76 with potentials $E_T$ and $E_S$ applied. When substrate 76 is conductive or semiconductive, and where the oxidized species O is formed at the tip, O can be reduced at substrate 76 producing R which in turn diffuses back to tip 56. This causes $I_T$ to be higher than it is when the tip is positioned in distal relation to the substrate. This is the feedback component of the current $I_T$. The smaller the distance between tip 56 and substrate 76, the larger the feedback current.

Unlike the generation/collection mode, this embodiment avoids a coupling transient current because only measurements at tip 56 are made.

In this preferred embodiment of the present invention, substrate 76 need not necessarily be connected to an external potential source. Most of substrate 76 is located away from the tip reaction and is bathed in a solution containing O thereby maintaining a potential positive of the oxidation reduction couple. It is sufficient that auxiliary electrode 59 shown in FIG. 2, is present in solution 64.

Working tip 56 is preferably scanned over substrate 76 at a speed sufficiently slow to allow quasi-steady-state tip currents $I_T$, to be generated and measured at each desired point.

5. Generation/Feedback Mode—Using a Nonconductive Substrate

Referring now to FIG. 3d, another preferred embodiment of the present invention is illustrated. Working tip 56 is positioned proximate and substantially perpendicular to insulative substrate 78 in solution 64. As discussed above, the auxiliary electrode causes the generation/feedback mode to produce a tip current without the requirement of connecting the substrate to an external potential source. In this mode, an essentially hemispherical diffusion field surrounds tip 56 as shown by diffusion field 80.

Referring to FIG. 3e, tip 56 is now positioned closer to substrate 78 than was illustrated by FIG. 3d. In FIG. 3e, insulative substrate 78 now interferes with the hemispherical diffusion field producing hindered diffusion field 82 causing a decrease in $I_T$ as the tip to substrate distance is decreased. A hindered diffusion field typically exists when the tip is approximately in the range of the tip diameter or less from the substrate. For example, if a tip having a 10 um diameter is utilized, hindered diffusion may be anticipated when the tip is approximately 20 um or less from the substrate. Smaller tip diameters will have a hindered diffusion field at a smaller distance from the surface of the substrate than shown in this example.

When tip 56 is scanned over substrate 78, the contour of substrate 78 may be mapped based on current $I_T$ at each position of tip 56.

6. Direct Measurement of a Contour of a Surface

In still another preferred embodiment of the present invention, the contour of a surface may be measured more directly. As shown in FIG. 2, substrate material 16 is immersed in solution 64 and working electrode tip 12 is positioned proximate a surface of substrate material 16. Bipotentiostat 34 is connected between tip 12 and substrate 16 generating a current through working tip 12 and producing an electrochemical reaction immediate tip 12. Bipotentiostat 34 maintains a substantially constant current in working tip 12 and maintains a substantially constant voltage level at working tip 12. Preferably, the voltage at tip 12 is measured relative to reference electrode 57 which is also positioned in solution 64. In another preferred embodiment, the voltage level at working tip 12 is measured relative to conductive or semiconductive substrate 16.

Working tip 12 is moved relative to the surface of substrate 16 and proximal to a plurality of points in a reference plane wherein the plurality of points comprise points proximal the surface of substrate 16. The distance of working tip 12 from the reference plane is varied. Because the tip voltage and tip current are maintained at substantially constant levels while varying the distance of the tip from the reference plane and, therefore, also from the substrate, measuring the distance of the working tip from the reference plane at each point of the plurality of points forming the reference plane produces a measure of the contour of the surface of substrate 16.

The varying distance of electrode tip 12 from the reference plane and substrate 16 may be measured directly or indirectly. Indirect measurements include, but are not limited to, measuring the change in voltage or current at z stage 52 or at fine piezoelectric element 54. Such current or voltage, as supplied by x-y-z stage controller 48, indirectly represents variations in distance of tip 12 from the surface of substrate 16.

7. Scanning Electrochemical Microscopy—Generally

Figure 5:
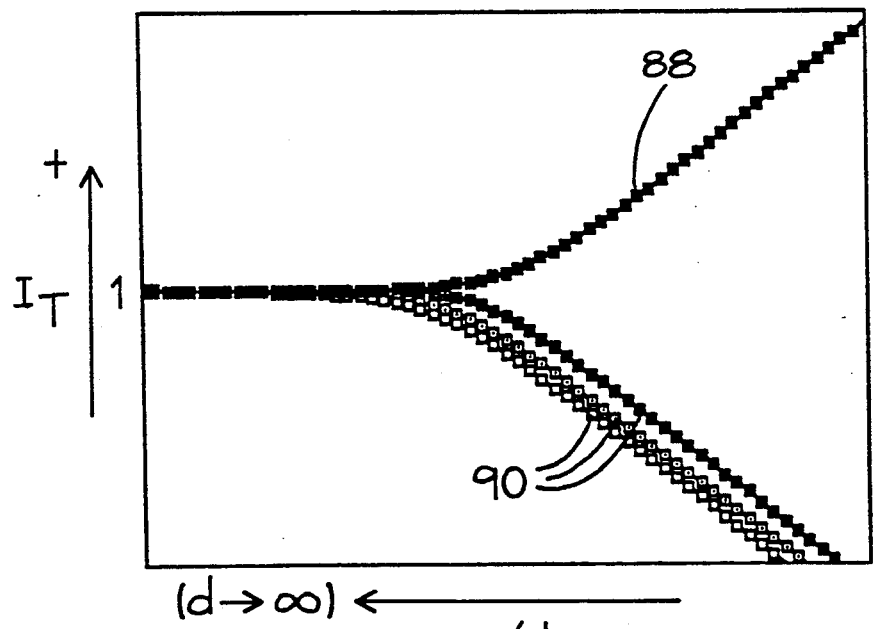
FIG. 5 is a graph of current plotted against the inverse of distance of a working electrode tip from a surface being scanned in accordance with the present invention.

FIG. 5 illustrates a principle of the methods of the present invention. In FIG. 5, the abscissa denotes the value a/d where d represents the distance between the working electrode tip and the substrate, and a represents the radius of the working electrode tip as shown in FIG. 3a. The ordinate graphs the normalized current $I_T/I_{T, \infty}$, where $I_{T, \infty}$ is the tip current at $d \rightarrow \infty$. Graph line 88 illustrates a conductive substrate and shows that current $I_T$ increases from a normalized value (1) as distance between tip and substrate decreases. This phenomenon is observed in both the generation/collection mode and in the generation/feedback mode utilizing a conductive or semiconductive substrate.

Graph lines 90 illustrate the use of an insulated substrate and the change in current $I_T$ relative to the distance between the working electrode tip and the substrate. As distance between the working electrode tip and the substrate decreases, current $I_T$ decreases from a normalized value. This is believed to result from the hindered diffusion field. Multiple insulative substrate graph lines 90 indicate results from various sized insulating sheaths positioned about the working electrodes.

Figure 6A:
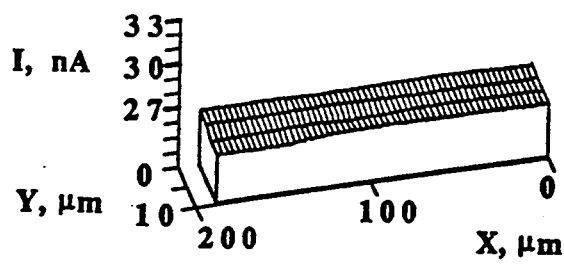
FIGS. 6a, b, c and d are graphs of measurements of electric current versus position of a working electrode tip relative to a scanned surface in accordance with the present invention.
Figure 6B:
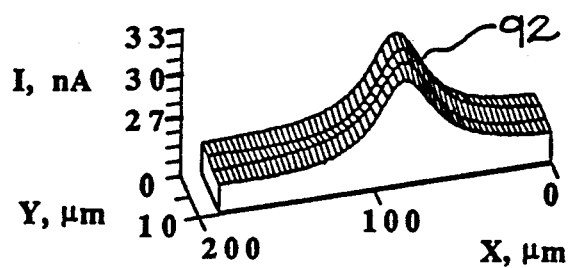
Figure 6C:
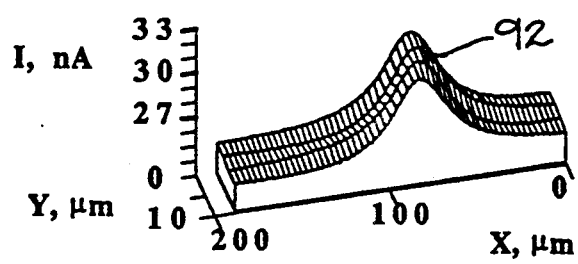
Figure 6D:
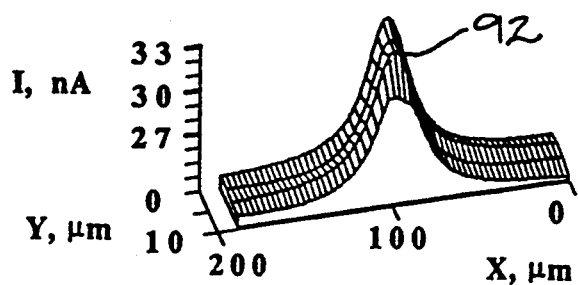

FIGS. 6a through d illustrate a typical result from a practice of the present invention. FIGS. 6a through d illustrate scans of a substrate comprising a 50 micron platinum wire positioned on a glass slide at different tip locations from the substrate. FIG. 6a illustrates the tip positioned distal from the substrate. FIG. 6b illustrates the tip positioned approximately 17.8 microns from the substrate; FIG. 6c illustrates the tip positioned approximately 2.18 microns closer than in FIG. 6b; and FIG. 6d illustrates the tip positioned approximately 4.35 microns closer than illustrated in FIG. 6b. The increased current, shown by rise 92 in FIGS. 6b, c and d, illustrates the position of the platinum wire on the insulative glass slide.

FIGS. 6a through d further illustrate a typical output in a scanning electrochemical microscope employing the present invention in a generation/feedback mode and illustrate the changing contour of the substrate.

Solution 64 is chosen based on consideration of either the chemical substance which is being searched for on the substrate or the chemical composition of the substrate where the contour of the substrate is to be graphed.

Figure 7A:
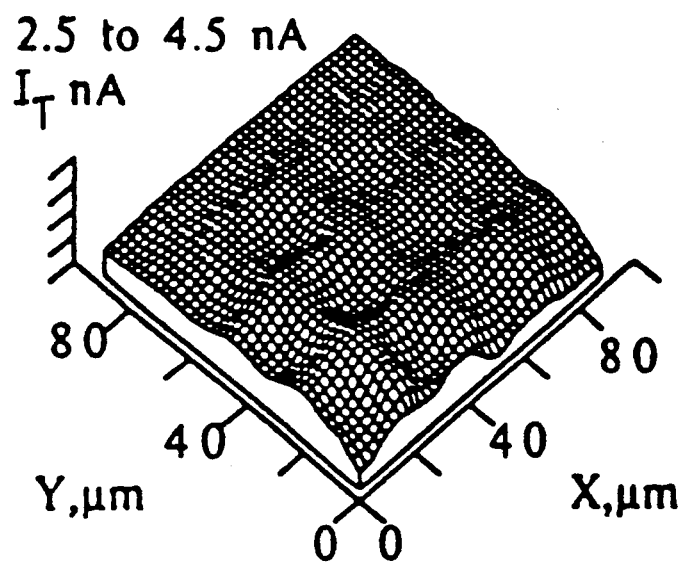
FIGS. 7a and b are graphs of measurements of electric current versus position of a working electrode tip relative to another scanned surface in accordance with the present invention.
Figure 7B:
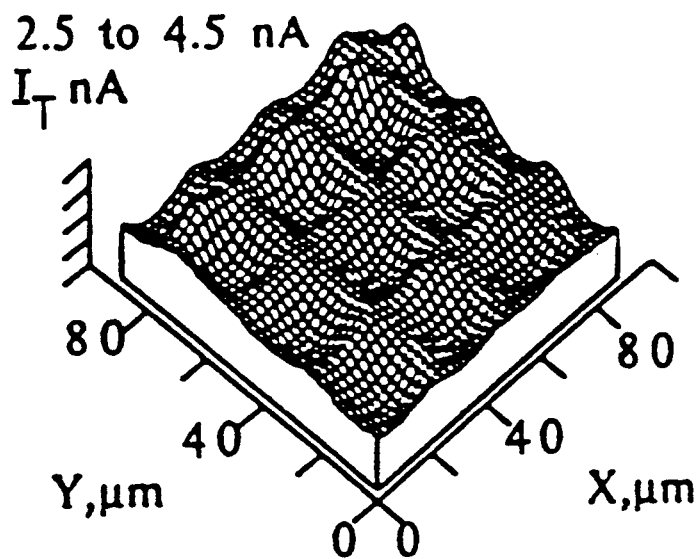

In all modes of the present invention where current $I_T$ is to be measured to determine the contour of a surface, solution 64 is chosen to enable oxidation and reduction processes to occur when a potential is applied to the working tip. For example, FIGS. 7a and b illustrate an output from a scanning electrochemical microscope employing the present invention scanning a conductive gold minigrid. The working tip in this example comprises a 5 um radius platinum disk at 0.4 volts with respect to a saturated calomel reference electrode. The minigrid is immersed in a solution of 0.1 molar (M) potassium chloride and 2.5 millimolar (mM) potassium ferrocyanide in water. The working tip is scanned at a rate of 25 um per second. FIG. 7a illustrates a first scan of the gold minigrid surface. FIG. 7b illustrates the results from a scan made at a different location on the minigrid than that represented in FIG. 7a.

Figure 8:
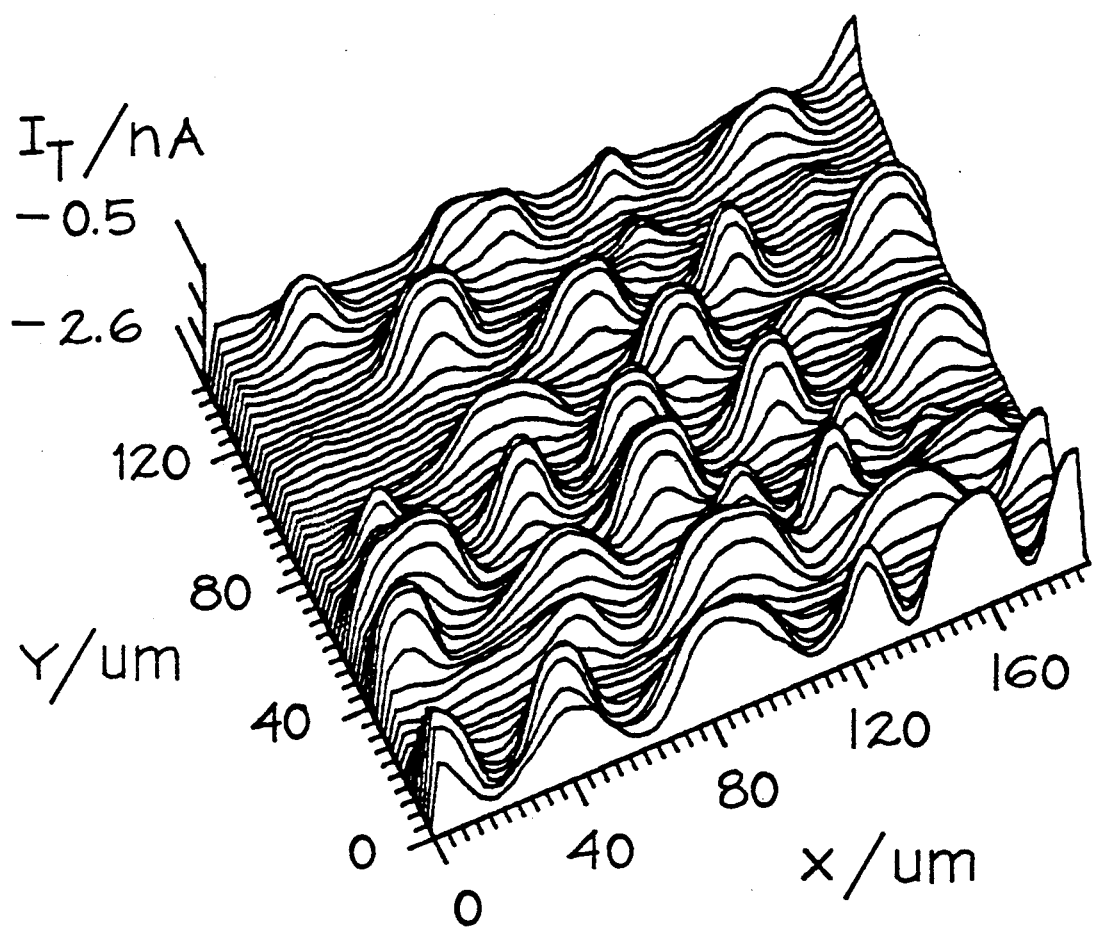
FIG. 8 is a graph of measurements of electric current versus position of a working electrode tip relative to still another scanned surface in accordance with the present invention; and, FIGS. 9a and b are graphs of measurements of electric current versus position of a working electrode tip relative to yet another scanned surface in accordance with the present invention.

By way of further example, FIG. 8 illustrates another output from a scanning electrochemical microscope employing the present invention scanning a biological sample in the form of a blade of grass. The grass is immersed in an aqueous solution of 20 mM $K_4Fe(CN)_6$ and 0.1 M KCl. The working tip comprises a 1 micron radius platinum disk at 0.7 volts with respect to a saturated calomel electrode. The working tip was brought near the grass substrate and scanned over its surface. At the applied potential, the reaction at the tip, $Fe(CN)_6^{4-} - -e- > Fe(CN)_6^{3-}$, causes an anodic current. The extent of the decrease in $I_T$ from $I_{T, \infty}$ is a measure of the tip to insulative substrate distance. Thus, the SECM scan, unlike an optical microscope, represents the surface topography of the sample.

Similarly, scans of a surface, such as a leaf, immersed in an appropriate solution, first scanned in the dark and then scanned under irradiation where the reaction detected by the working tip is the reduction of oxygen produced by photosynthesis, enables the collection of information about the distribution of reaction sites on a substrate surface.

Figure 9A:
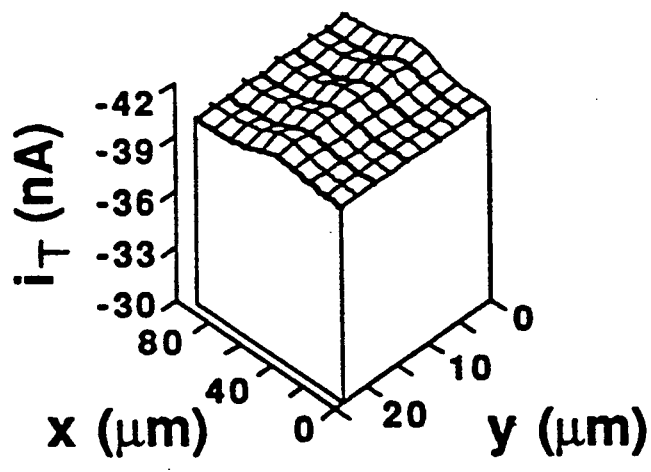
Figure 9B:
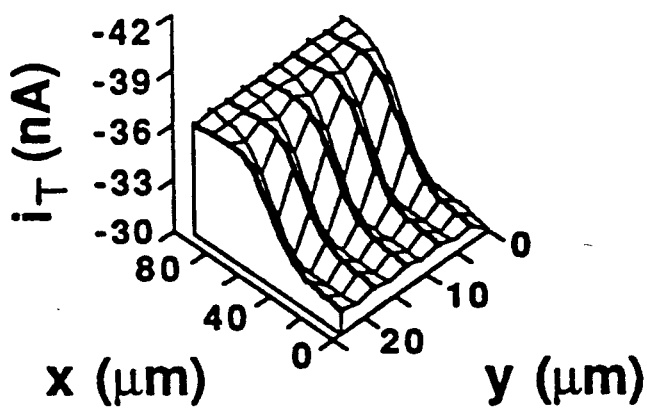

By way of still further example and referring to FIGS. 9a and b, the potential dependence of the conductivity of a polypyrrole polymer (PP) film is illustrated by the outputs from a scanning electrochemical microscope employing the present invention in the feedback mode. In this example, the substrate comprises a 2 millimeter platinum disk on a portion of which a PP film was grown. The solution used comprises 10 mM $Ru(NH_3)_6^{3+}$ and 0.1 M $K_2SO_4$. The working tip is scanned across the surface of the substrate immersed in the solution. FIG. 9a illustrates the results ($I_T$) of the scan where the working tip potential with respect to the reference electrode is 0.4 volts and the substrate potential with respect to the reference electrode is 0.7 volts. FIG. 9b illustrates the same area, scanned at the same distance from the substrate as in FIG. 9a. In FIG. 9b, the substrate potential with respect to the reference electrode is −0.1 volts. In FIG. 9b, the substrate potential causes the PP to become insulative, rather than conductive as in FIG. 9a. Thus, FIG. 9a illustrates the present invention used to indicate the contour of a substrate and FIG. 9b illustrates the present invention used to indicate the location of substances on the surface of a substrate.

In all modes of the present invention where current $I_T$ is to be measured to determine the location of a chemical substance on a surface of a substrate, solution 64 is chosen to enable oxidation and reduction processes to occur either immediate the substrate not containing the chemical substance or immediate the chemical substance or a combination thereof to varying degrees.

Also by way of example, where electrogenerated chemiluminescence is utilized in the present invention for the purpose of imaging (i.e. determining the countours of) an inert conductive or semiconductive surface, including but not limited to, platinum, gold, graphite, or indium tin oxide, the aqueous solution may, for example, contain 1 millimolar ruthenium(II) tris-2,2′-bipyridine and 30 millimolar sodium oxalate contained in a phosphate buffer at pH 5. The potential of the tip is preferably held at a value where the substrate would attain a sufficiently positive value, for example +1.1 V with respect to a saturated calomel electrode, that oxidation of the ruthenium(II) tris-2,2′-bipyridine would occur and produce light emission that is detectable with a photomultiplier tube or other light detector located near the tip and immediately above the substrate.

By way of further example, where inverse photoemission spectroscopy is used in the present invention for the purpose of imaging an inert conductive or semiconductive substrate, including but not limited to, platinum or copper-doped zinc sulfide, the electrolyte solution may comprise acetonitrile having 0.1 molar tetra-n-butylammonium peroxydisulfate. The tip potential is preferably held at a value where reduction of peroxydisulfate occurs on the substrate to produce emission which is characteristic of the substrate material and is detectable with a very sensitive light detector (including but not limited to a single photon counting system or a cooled charge coupled device camera).

In an alternate embodiment of the present invention, the generation/feedback mode may be utilized by maintaining a constant current in the working tip and measuring a varying voltage in the working tip.

Additionally, where an insulated substrate is used, the tip potential is measured relative to a reference electrode. As used throughout this application, reference electrodes include but are not limited to electrodes such as a silver quasireference electrode or a saturated calomel electrode.

The examples used herein are intended to be illustrative only and are not to be taken as limitations of the present invention.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements or materials may be substituted for those illustrated and described herein and certain features of the invention may be utilized independently of the use of other features, all as would be apparent to one skilled in the art after having the benefit of this description of the invention.

We claim:

1. A method of locating a chemical substance on a surface of a material comprising the steps of:
    immersing said surface in a solution selected to be capable of supporting redox processes with said chemical substance;
    positioning a tip of a working electrode in said solution proximate said surface at a distance of 1 nm to 10 microns;
    connecting a controllable electric potential between said tip and said material;
    setting said electric potential to produce an electrochemical reaction carried by said redox process immediate said working tip, said reaction generating a current through said tip;
    moving said working electrode tip relative to said surface and proximal to a plurality of points in a reference plane wherein said plurality of points comprises at least one point proximal said chemical substance, wherein a substantially constant distance of said working electrode tip from said reference plane is maintained; and
    measuring working tip faradaic current at each point of said plurality of points wherein measured tip currents locate said chemical substance on said surface.

2. The method of claim 1 wherein said connecting step further comprises connecting a direct current electric potential between said tip and said material.

3. The method of claim 1 wherein said connecting step further comprises connecting an electric current having an alternating current component between said working tip and said material.

4. The method of claim 3 wherein said measuring step includes measuring said alternating current component and a phase angle of said alternating current component between said material and said working tip.

5. The method of claim 1 wherein said material is a conductive material.

6. The method of claim 1 wherein said material is a semiconductive material.

7. A method of determining a contour of a surface of a material comprising the steps of:
    immersing said surface in a solution selected to be capable of supporting redox processes with said surface;
    positioning a tip of a working electrode in said solution proximate said surface at a distance of 1 nm to 10 microns;
    connecting a controllable electric potential between said tip and said material;
    setting said electric potential to produce an electrochemical reaction carried by said redox processes immediate said working tip, said reaction generating a current through said tip;
    moving said working electrode tip relative to said surface and proximal to a plurality of points in a reference plane wherein said plurality of points comprises points proximal said surface, wherein a substantially constant distance of said working electrode tip from said reference plane is maintained; and
    measuring working tip faradaic current at each point of said plurality of points wherein measured tip currents form an image determining said contour of said surface.

8. The method of claim 7 wherein said connecting step further comprises connecting a direct current electric potential between said tip and said material.

9. The method of claim 7 wherein said connecting step further comprises connecting an electric current having an alternating current component between said working tip and said material.

10. The method of claim 9 wherein said measuring step further comprises measuring said alternating current component and a phase angle of said alternating current component between said material and said working tip.

11. The method of claim 7 wherein said material is a conductive material.

12. The method of claim 7 wherein said material is a semiconductive material.

13. A method of determining a contour of a surface of a material comprising the steps of:
- immersing said surface in a solution selected to be capable of supporting redox processes with said surface;
- positioning a tip of a working electrode in said solution proximate said surface at a distance of 1 nm to 10 microns;
- positioning a tip of an auxiliary electrode in said solution in distal relation to said working electrode;
- connecting a controllable electric potential between said working electrode and said auxiliary electrode;
- setting said electric potential to produce an electrochemical reaction carried by said redox processes immediate said working tip, said reaction generating a current through said tip;
- moving said working electrode tip relative to said surface and proximal to a plurality of points in a reference plane wherein said plurality of points comprises points proximal said surface, wherein a substantially constant distance of said working electrode tip from said reference plane is maintained; and
- measuring a faradaic electric current flowing through said working electrode tip at each point of said plurality of points wherein measured tip currents form an image determining said contour of said surface.

14. The method of claim 13 further comprising the step of positioning a tip of a reference electrode in said solution near said working electrode tip and measuring an electric potential of said working electrode with respect to said reference electrode.

15. The method of claim 14 wherein said step of measuring said electric potential comprises connecting a high impedance voltage measuring means between said reference electrode and said working electrode.

16. The method of claim 13 further comprising the step of maintaining said electric potential at a substantially constant level.

17. The method of claim 13 wherein said moving step further comprises moving said working electrode tip relative to said surface at a speed sufficient to establish said current at at least a quasi-steady-state level.

18. The method of claim 13 wherein said material is electrically insulative material.

19. The method of claim 13 wherein said material is electrically semiconductive material.

20. The method of claim 13 wherein said material is electrically conductive material.

21. A method of locating a chemical substance on a surface of a material comprising the steps of:
- immersing said surface in a solution selected to be capable of supporting redox processes with said chemical substance;
- positioning a tip of a working electrode in said solution proximate said surface at a distance of 1 nm to 10 microns;
- positioning tip of an auxiliary electrode in said solution in distal relation to said working electrode;
- connecting a controllable electric potential between said working electrode and said auxiliary electrode;
- setting said electric potential to produce an electrochemical reaction carried by said redox processes immediate said working tip, said reaction generating a current through said tip;
- moving said working electrode tip relative to said surface and proximal to a plurality of points in a reference plane wherein said plurality of points comprises at least one point proximal said chemical substance, wherein a substantially constant distance of said working electrode tip from said reference plane is maintained; and
- measuring faradaic current flowing through said working electrode tip at each point of said plurality of points wherein measured tip currents locate said chemical substance on said surface.

22. The method of claim 21 further comprising the step of positioning a tip of a reference electrode in said solution near said working electrode tip and measuring an electric potential of said working electrode with respect to said reference electrode.

23. The method of claim 22 wherein said step of measuring said electric potential comprises connecting a high impedance voltage measuring means between said reference electrode and said working electrode.

24. The method of claim 21 further comprising a step of maintaining said electric potential at a substantially constant level.

25. The method of claim 21 further comprising a step of varying said working tip electric potential with respect to said reference electrode and measuring said working tip current at a plurality of said working tip electric potentials.

26. The method of claim 21 wherein said moving step further comprises moving said working electrode tip relative to said surface at a speed sufficient to establish said electric current at at least a quasi-steady-state level.

27. The method of claim 21 wherein said substance is electrically insulative material.

28. The method of claim 21 wherein said substance is electrically semiconductive material.

29. The method of claim 21 wherein said substance is electrically conductive material 30. A method of determining a contour of a surface comprising the steps of:
- immersing said surface in a solution selected to be capable of supporting redox processes with said surface;
- positioning a tip of a working electrode in said solution proximate said surface at a distance of 1 nm to 10 microns;
- positioning a tip of an auxiliary electrode in said solution in distal relation to said working electrode;
- connecting a controllable electric potential between said working electrode and said auxiliary electrode and producing a faradaic electric current in said working tip;
- setting said electric potential to produce an electrochemical reaction carried by said redox processes immediate said working tip; maintaining a substantially constant faradaic current level in said working tip;
- moving said working electrode tip relative to said surface and proximal to a plurality of points in a reference plane wherein said plurality of points comprises points proximal said surface, wherein a substantially constant distance of said working electrode tip from said reference plane is maintained; and
- measuring a voltage at said working tip at each point of said plurality of points wherein measured tip voltages form an image determining said contour of said surface.

31. The method of claim 30 wherein said measuring step further comprises positioning a tip of a reference electrode in said solution near said working electrode tip and measuring an electric potential of said working electrode with respect to said reference electrode.

32. The method of claim 30 wherein said moving step further comprises moving said working electrode tip relative to said surface at a speed sufficient to establish said voltage at at least a quasi-steady-state level.

33. The method of claim 30 wherein said surface is electrically insulative material.

34. The method of claim 30 wherein said surface is electrically semiconductive material.

35. The method of claim 30 wherein said surface is electrically conductive material.

36. A method of determining a contour of a surface of a material comprising the steps of:
   immersing said surface in a solution selected to be capable of supporting redox processes with said surface;
   positioning a tip of a working electrode in said solution proximate said surface at a distance of 1 nm to 10 microns;
   connecting a controllable electric potential between said tip and said material;
   setting said electric potential to produce an electrochemical reaction carried by said redox processes immediate said working tip, said reaction generating a current through said tip;
   maintaining a substantially constant faradaic current level in said working tip;
   maintaining a substantially constant voltage level at said working tip;
   moving said working electrode tip relative to said surface and proximal to a plurality of points in a reference plane wherein said plurality of points comprises points proximal and surface;
   varying the distance of said working tip from said reference plane at each point of said plurality of pints to maintain a substantially constant current level; and
   measuring said distances of said working tip from said reference plane wherein said measured distances form an image determining said contour of said surface.

37. The method of claim 36 wherein said material is a conductive material.

38. The method of claim 36 wherein said material is a semiconductive material.

39. The method of claim 36 wherein said varying step further comprises measuring a control signal controlling the position of said working electrode relative to said surface at each point of said plurality of points.

40. A method of determining a contour of a surface of a material comprising the steps of:
   immersing said surface in a solution selected to be capable of supporting redox processes with said surface;
   positioning a tip of a working electrode in said solution proximate said surface at a distance of .1 nm to 10 microns;
   positioning a tip of an auxiliary electrode in said solution in distal relation to said working electrode;
   connecting a controllable electric potential between said working electrode and said auxiliary electrode;
   setting said electric potential to produce an electrochemical reaction carried by said redox processes immediate said working tip, said reactions generating a current through said tip;
   maintaining a substantially constant faradaic current level in said working tip;
   maintaining a substantially constant voltage level at said working tip;
   moving said working electrode tip relative to said surface and proximal to a plurality of points in a reference plane at a distance of 1 nm to 10 wherein said plurality of points comprises points proximal said surface;
   varying the distance of said working tip from said reference plane at each point of said plurality of points to maintain a substantially constant faradaic current level; and
   measuring said distances of said working tip from said reference plane wherein said measured distances form an image determining said contour of said surface.

41. The method of claim 40 further comprising a step of positioning a tip of a reference electrode in said solution near said working electrode tip and measuring an electric potential of said working electrode with respect to said reference electrode.

42. The method of claim 40 wherein said material is electrically insulative material.

43. The method of claim 40 wherein said material is electrically semiconductive material.

44. The method of claim 40 wherein said material is electrically conductive material.

45. The method of claim 40 wherein said varying step further comprises measuring a control signal controlling the position of said working electrode relative to said surface at each point of said plurality of points.

* * * * *

UNITED STATES PATENT AND TRADEMARK OFFICE
CERTIFICATE OF CORRECTION

PATENT NO. : 5,202,004

DATED : April 13, 1993

INVENTOR(S) : Kwak et al

It is certified that error appears in the above-identified patent and that said Letters Patent is hereby corrected as shown below:

In claim 1, line 66, column 13, delete the word "process" and insert the word --processes-- , therefor.

In claim 21, line 60, column 15, insert the word --a-- immediately after the word "positioning".

In claim 29, line 38, column 16, insert a period --.-- immediately after "material".

In claim 36, line 37, column 17, delete the word "and" and insert the word --said-- , therefor.

In claim 36, line 40, column 17, delete the word "pints" and insert the word --points-- , therefor.

In claim 40, line 26, column 18, insert the word --microns-- immediately after the number "10".

Signed and Sealed this

Seventh Day of December, 1993

*Attest:*

BRUCE LEHMAN

*Attesting Officer*    *Commissioner of Patents and Trademarks*